United States Patent
Rao et al.

(10) Patent No.: US 11,016,783 B2
(45) Date of Patent: May 25, 2021

(54) SECURE STORAGE ACCESS UTILIZING MULTI-PATH LAYER OF HOST DEVICE TO IDENTIFY PROCESSES EXECUTED ON THE HOST DEVICE WITH AUTHORIZATION TO ACCESS DATA OF A STORAGE SYSTEM

(71) Applicant: EMC IP Holding Company LLC, Hopkinton, MA (US)

(72) Inventors: Vinay G. Rao, Bangalore (IN); Sanjib Mallick, Bangalore (IN); Stephen D. Smaldone, Woodstock, CT (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 124 days.

(21) Appl. No.: 16/522,152

(22) Filed: Jul. 25, 2019

(65) Prior Publication Data

US 2021/0026650 A1 Jan. 28, 2021

(51) Int. Cl.
*G06F 3/00* (2006.01)
*G06F 9/4401* (2018.01)
*G06F 3/06* (2006.01)

(52) U.S. Cl.
CPC .............. *G06F 9/4411* (2013.01); *G06F 3/00* (2013.01); *G06F 3/0604* (2013.01); *G06F 3/067* (2013.01); *G06F 3/0637* (2013.01)

(58) Field of Classification Search
CPC ....... G06F 9/4411; G06F 3/0604; G06F 3/067
See application file for complete search history.

(56) References Cited

U.S. PATENT DOCUMENTS

| 6,687,746 | B1 | 2/2004 | Shuster et al. |
| 6,697,875 | B1 | 2/2004 | Wilson |
| 7,275,103 | B1 * | 9/2007 | Thrasher ................. H04L 45/22 709/223 |
| 7,454,437 | B1 | 11/2008 | Lavallee et al. |
| 7,770,053 | B1 | 8/2010 | Bappe et al. |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Tammara R Peyton
(74) *Attorney, Agent, or Firm* — Ryan, Mason & Lewis, LLP

(57) ABSTRACT

An apparatus comprises a host device configured to communicate over a network with a storage system comprising a plurality of storage devices. The host device is further configured to execute multiple processes that generate input-output (IO) operations for delivery to the storage system. The host device comprises a multi-path input-output (MPIO) driver configured to store for each of one or more of the storage devices information specifying one or more of the processes executing on the host device that are permitted to access that storage device, and for each of at least a subset of the IO operations, to determine the particular storage device to which the IO operation is directed, to identify the process that generated the IO operation, and to control delivery of the IO operation based at least in part on whether or not the stored information indicates that the identified process is permitted to access the particular storage device.

20 Claims, 4 Drawing Sheets

(56) References Cited

U.S. PATENT DOCUMENTS

| | | | |
|---|---|---|---|
| 7,809,912 | B1 | 10/2010 | Raizen et al. |
| 7,818,428 | B1 | 10/2010 | Lavallee et al. |
| 7,904,681 | B1 | 3/2011 | Bappe et al. |
| 7,925,872 | B2 | 4/2011 | Lai et al. |
| 8,843,789 | B2 * | 9/2014 | Sandstrom .......... G06F 11/0727 714/43 |
| 9,400,611 | B1 | 7/2016 | Raizen |
| 9,594,780 | B1 | 3/2017 | Esposito et al. |
| 9,778,852 | B1 | 10/2017 | Marshak et al. |
| 10,353,714 | B1 | 7/2019 | Gokam et al. |
| 2004/0010563 | A1 | 1/2004 | Forte et al. |
| 2008/0043973 | A1 | 2/2008 | Lai et al. |
| 2011/0197027 | A1 | 8/2011 | Balasubramanian et al. |
| 2012/0159474 | A1 * | 6/2012 | Chakhaiyar .......... G06F 3/0659 718/1 |
| 2016/0117113 | A1 | 4/2016 | Li et al. |
| 2018/0189635 | A1 | 7/2018 | Olarig et al. |
| 2019/0095299 | A1 | 3/2019 | Liu et al. |
| 2019/0108888 | A1 | 4/2019 | Sarkar et al. |

OTHER PUBLICATIONS

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

U.S. Appl. No. 15/849,828, filed in the name of Sanjib Mallick et al. Dec. 21, 2017 and entitled "Storage System with Input-Output Performance Control Utilizing Application Process Detection."

U.S. Appl. No. 15/795,653, filed in the name of Maneesh Pusalkar et al. Oct. 27, 2017 and entitled "Storage System with Network-Wide Configurable Device Names."

U.S. Appl. No. 16/142,274, filed in the name of Sanjib Mallick et al. Sep. 26, 2018 and entitled "Host Device with Multi-Path Layer Implementing Automatic Standby Setting for Active-Active Configuration."

* cited by examiner

FIG. 4

**ACCESS TABLE FOR HOST DEVICE *i*** — 400

| | | |
|---|---|---|
| STORAGE DEVICE 1 | PERMITTED PROCESS NAME(S) | PID(S) |
| STORAGE DEVICE 2 | PERMITTED PROCESS NAME(S) | PID(S) |
| ... | | |
| STORAGE DEVICE M | PERMITTED PROCESS NAME(S) | PID(S) |

SECURE STORAGE ACCESS UTILIZING MULTI-PATH LAYER OF HOST DEVICE TO IDENTIFY PROCESSES EXECUTED ON THE HOST DEVICE WITH AUTHORIZATION TO ACCESS DATA OF A STORAGE SYSTEM

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operations for delivery to the storage system. In arrangements of this type, a number of distinct security issues can arise. For example, a hacker can breach the security protections of a host device operating system and modify the code of an existing process to incorporate malware. It is also possible that a hacker gaining access to the host device operating system can cause a new process containing malware to run on the host device. In these and other situations, hackers can use the modified and/or added processes to gain access to sensitive data of the storage system. Conventional anti-virus techniques, which are typically implemented at a file system level, generally cannot detect such security threats. A need therefore exists for improved techniques for preventing unauthorized processes of a host device from accessing sensitive data.

SUMMARY

Illustrative embodiments configure a multi-path layer of one or more host devices to include functionality for secure storage access in conjunction with communication with a storage array or other type of storage system via a storage area network (SAN) or other type of network. The multi-path layer illustratively comprises at least one multi-path input-output (MPIO) driver configured to process IO operations of at least one host device. In some embodiments, the MPIO driver implements secure storage access control in conjunction with path selection in order to protect against security threats of the type described above.

In one embodiment, an apparatus comprises a host device configured to communicate over a network with a storage system comprising a plurality of storage devices. The host device is further configured to execute multiple processes that generate IO operations for delivery to the storage system. The host device comprises an MPIO driver configured to control delivery of the IO operations to the storage system over selected ones of a plurality of paths through the network. The MPIO driver is further configured to store for each of one or more of the storage devices information specifying one or more of the processes executing on the host device that are permitted to access that storage device, and for each of at least a subset of the IO operations, to determine the particular storage device to which the IO operation is directed, to identify the process that generated the IO operation, and to control delivery of the IO operation based at least in part on whether or not the stored information indicates that the identified process is permitted to access the particular storage device.

In some embodiments, the stored information comprises an access table. The access table illustratively comprises a plurality of entries for different ones of the storage devices, with each such entry comprising a process name and/or a process identifier for a process permitted to access the corresponding storage device.

In some embodiments, controlling delivery of the IO operation based at least in part on whether or not the stored information indicates that the identified process is permitted to access the particular storage device comprises at least one of preventing delivery of the IO operation to the storage system responsive to the stored information indicating that the identified process is not permitted to access the particular storage device, and permitting delivery of the IO operation to the storage system responsive to the stored information indicating that the identified process is permitted to access the particular storage device.

These and other illustrative embodiments include, without limitation, apparatus, systems, methods and computer program products comprising processor-readable storage media.

BRIEF DESCRIPTION OF THE DRAWINGS

FIG. 4 shows an example of an access table implemented in a multi-path layer of a host device in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
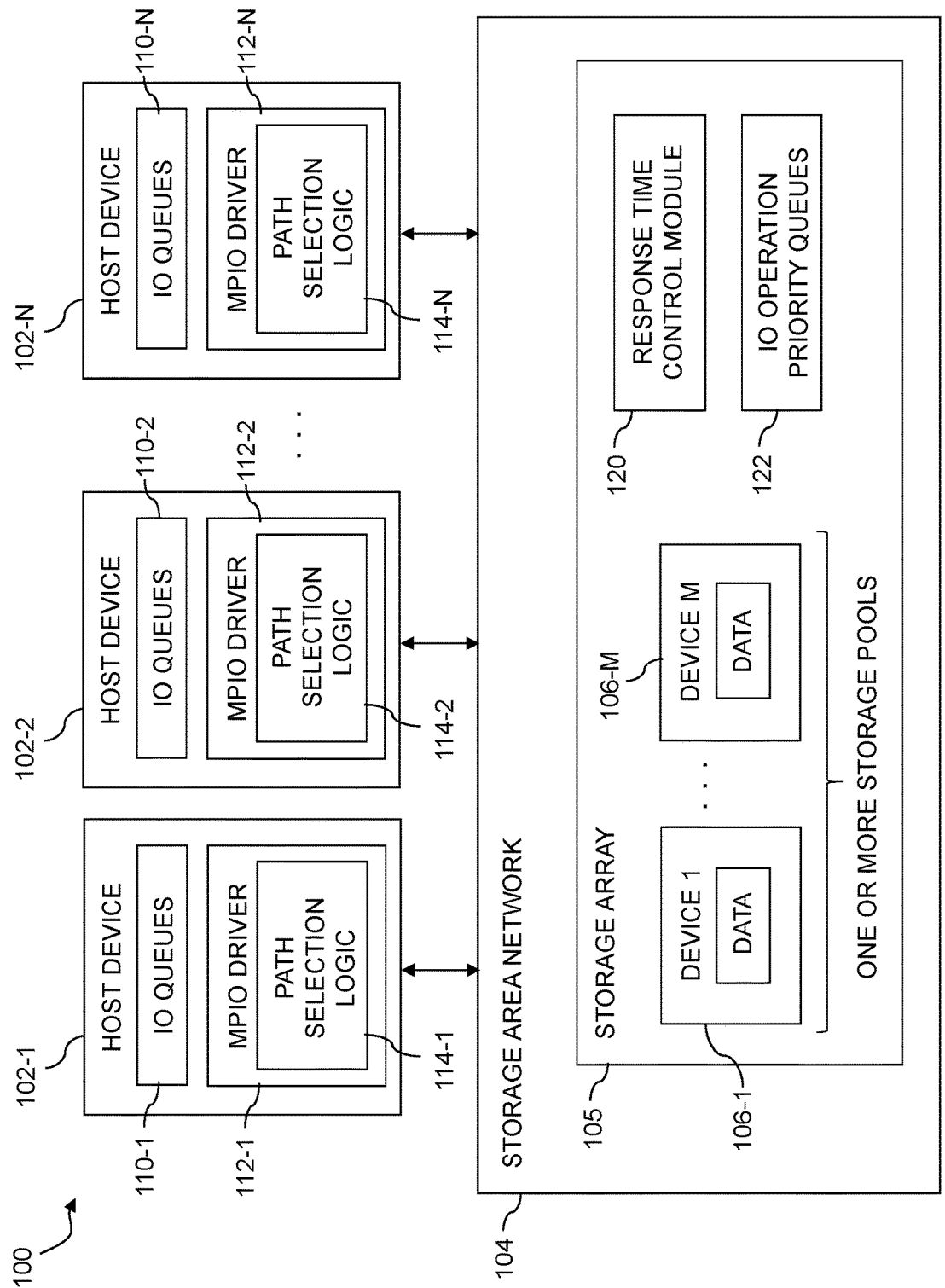
FIG. 1 is a block diagram of an information processing system configured with functionality for secure storage access utilizing a multi-path layer of a host device in an illustrative embodiment.

FIG. 1 shows an information processing system 100 configured in accordance with an illustrative embodiment. The information processing system 100 comprises a plurality of host devices 102-1, 102-2, ... 102-N. The host devices 102 communicate over a storage area network (SAN) 104 with at least one storage array 105. The storage array 105 comprises a plurality of storage devices 106-1, ... 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for secure storage access using respective instances of path selection logic 114-1, 114-2, . . . 114-N implemented within the MPIO drivers 112.

The MPIO drivers 112 may comprise, for example, otherwise conventional MPIO drivers, such as PowerPath® drivers from Dell EMC, suitably modified in the manner disclosed herein to provide secure storage access functionality. Other types of MPIO drivers from other driver vendors may be suitably modified to incorporate functionality for secure storage access as disclosed herein.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO driver 112-1 is further configured to store for each of one or more of the storage devices 106 information specifying one or more of the processes executing on the host device 102-1 that are permitted to access that storage device, and for each of at least a subset of the IO operations, to determine the particular storage device to which the IO operation is directed, to identify the process that generated the IO operation, and to control delivery of the IO operation based at least in part on whether or not the stored information indicates that the identified process is permitted to access the particular storage device.

A more detailed example of an arrangement of this type is described below in conjunction with the embodiment of FIG. 2.

References herein to an MPIO driver such as MPIO driver 112-1 being configured to "store information" are intended to be broadly construed, and should not be viewed as being limited to any particular storage arrangement, such as storage in a particular host device component or using a particular format. Accordingly, such storage can be in a memory or other storage device that is outside of the MPIO driver.

The stored information illustratively comprises one or more access tables. For example, a given such access table comprises a plurality of entries for different ones of the storage devices 106, with each such entry comprising identifying information of at least one process permitted to access the corresponding storage device. The identifying information can comprise at least one of a process name and a process identifier for the process permitted to access the corresponding storage device. An access table of this type will be described in more detail below in conjunction with the embodiment of FIG. 4.

At least a portion of the access table may be generated by the MPIO driver 112-1 and sent by the MPIO driver 112-1 to the storage array 105 for storage therein, illustratively in a persistent memory of the storage array 105.

The MPIO driver 112-1 is illustratively configured to generate an initial version of the access table responsive to at least one of a boot of the host device 102-1 and an install of one or more applications for execution on the host device 102-1. The MPIO driver 102-1 is assumed to populate the access table with process identifiers at runtime. One or more subsequent updates to the access table performed in conjunction with application restart are implemented at least in part as user-ordered actions.

A variety of additional or alternative conditions can lead to generation of a new access table and/or updating of existing access table in illustrative embodiments. For example, the addition of a new storage device to the set of storage devices 106 can cause a new entry for that storage device to be added to an existing access table. Similarly, the deletion of an existing storage device from the set of storage devices 106 can cause an existing entry for that storage device to be removed from the access table. It is to be appreciated that the disclosed embodiments are not limited to use with one or more access tables, and can more generally be used with other types of stored information.

The MPIO driver 112-1 controlling delivery of the IO operation based at least in part on whether or not the stored information indicates that the identified process is permitted to access the particular storage device illustratively comprises the MPIO driver 112-1 preventing delivery of the IO operation to the storage array 105 responsive to the stored information indicating that the identified process is not permitted to access the particular storage device. By preventing delivery of the IO operation in this manner, the corresponding security threat is effectively neutralized as the IO operation cannot gain access to potentially sensitive data of the storage array 105. Other types of neutralization of detected security threats can be implemented in other embodiments responsive to the stored information indicating that the identified process is not permitted to access the particular storage device For example, the MPIO driver 112-1 controlling delivery of the IO operation based at least in part on whether or not the stored information indicates that the identified process is permitted to access the particular storage device illustratively comprises the MPIO driver 112-1 diverting the IO operation to a designated temporary location responsive to the stored information indicating that the identified process is not permitted to access the particular storage device. More particularly, the MPIO driver 112-1 can divert the IO operation to a designated temporary location in a memory of the host device 102-1 or the storage array 105 for performance of further security analysis operations.

Numerous other types of actions can be taken responsive to the stored information indicating that the identified process is not permitted to access the particular storage device, in order to address an associated security threat. As another example, the MPIO driver 112-1 can trigger the generation of a security alert to the host device 102-1 responsive to the stored information indicating that the identified process is not permitted to access the particular storage device. Such security alerts or other types of notifications can additionally or alternatively be provided by the MPIO driver 112-1 to the storage array 105, and can lead to further security-related preventative measures, such as an at least temporary suspension of the process and possibly also its corresponding application.

In the event that the stored information indicates that the identified process that generated the IO operation is permitted to access the particular storage device, the MPIO driver 112-1 permits delivery of the IO operation to the storage array 105. As a result, the path selection logic 114-1 of the MPIO driver 112-1 selects an appropriate path for delivery of that IO operation to the storage array 105, and the IO operation is then delivered to the storage array 105 over the SAN 104 via the selected path.

In some embodiments, one or more of the storage devices 106 are marked as having respective entries in the stored information. Such markings are illustratively stored in a persistent memory of the storage array 105 responsive to commands or other indications received from the host device 102-1. For example, the marking of the storage devices illustratively comprises sending one or more predetermined commands from the host device 102-1 to the storage array 105, to indicate which of the storage devices 106 are being protected by the secure access control functionality of the multi-path layer. Such predetermined commands can comprise, for example, a log sense command, a mode sense command, a "vendor unique command" or VU command, or combinations of multiple instances of these or other commands, in an otherwise standardized command format.

As noted above, the stored information utilized to provide secure storage access illustratively comprises an access table, and the MPIO driver 112-1 can periodically send the access table to the storage array 105 for storage therein, such that the access table is stored in both the host device 102-1 and the storage array 105.

In embodiments of this type, the MPIO driver 112-1 compares a first version of the access table stored in the host device 102-1 with a second version of the access table stored in the storage array 105, and triggers an alert to the host device 102-1 if the first and second versions of the access table do not match one another. For example, such a comparison can be performed responsive to a reboot of the host device 102-1, or under other specified conditions, and provides the MPIO driver 112-1 with additional assurances that the access table has not been subject to unauthorized modification.

Additionally or alternatively, the MPIO driver 112-1 can add an application tag to a given IO operation so as to permit the storage array to perform a validity check on the IO operation. The application tag illustratively indicates a name or other identifier of a particular application that includes the process that generated the IO operation. Process tags can be used in addition to or in place of application tags. Examples of techniques that can be used to generate such tags are disclosed in U.S. patent application Ser. No. 15/849,828, filed Dec. 21, 2017 and entitled "Storage System with Input-Output Performance Control Utilizing Application Process Detection," now issued as U.S. Pat. No. 10,474,367, which is incorporated by reference herein.

These and other secure storage access related operations referred to herein as being performed by or under the control of the MPIO driver 112-1 can in some embodiments be performed at least in part outside of the MPIO driver 112-1, such as in the host device 102-1 generally.

As indicated previously, absent use of the secure storage access techniques in a multi-path layer as disclosed herein, it can be difficult to detect and neutralize certain types of security threats, such as security threats in which a hacker modifies the code of an existing process running on the host device to incorporate malware, or causes a new process containing malware to run on the host device.

Such drawbacks are advantageously overcome in illustrative embodiments herein by utilization of a multi-path layer comprising one or more of the MPIO drivers 112 to provide secure storage access as described above. These embodiments therefore provide a significant advance over conventional anti-virus techniques that are typically implemented at a file system level and cannot detect such security threats.

As mentioned above, the host device 102-1 may be configured to generate an alert or other type of notification for delivery to a host administrator responsive to detection of an unauthorized process attempting to access a storage device of the storage array 105. Additionally or alternatively, the host device 102-1 may be configured to generate an alert or other notification for delivery to the storage array 105 responsive to detection of an unauthorized process attempting to access a storage device of the storage array 105. Other types of notification arrangements are utilized in other embodiments.

The above-described functions associated with secure storage access functionality of the MPIO driver 112-1 are carried out at least in part under the control of its path selection logic 114-1. For example, the path selection logic 114-1 is illustratively configured to control performance of an algorithm comprising the steps of the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for secure storage access.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support secure storage access.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in the above-cited U.S. patent application Ser. No. 15/849,828.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 210, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
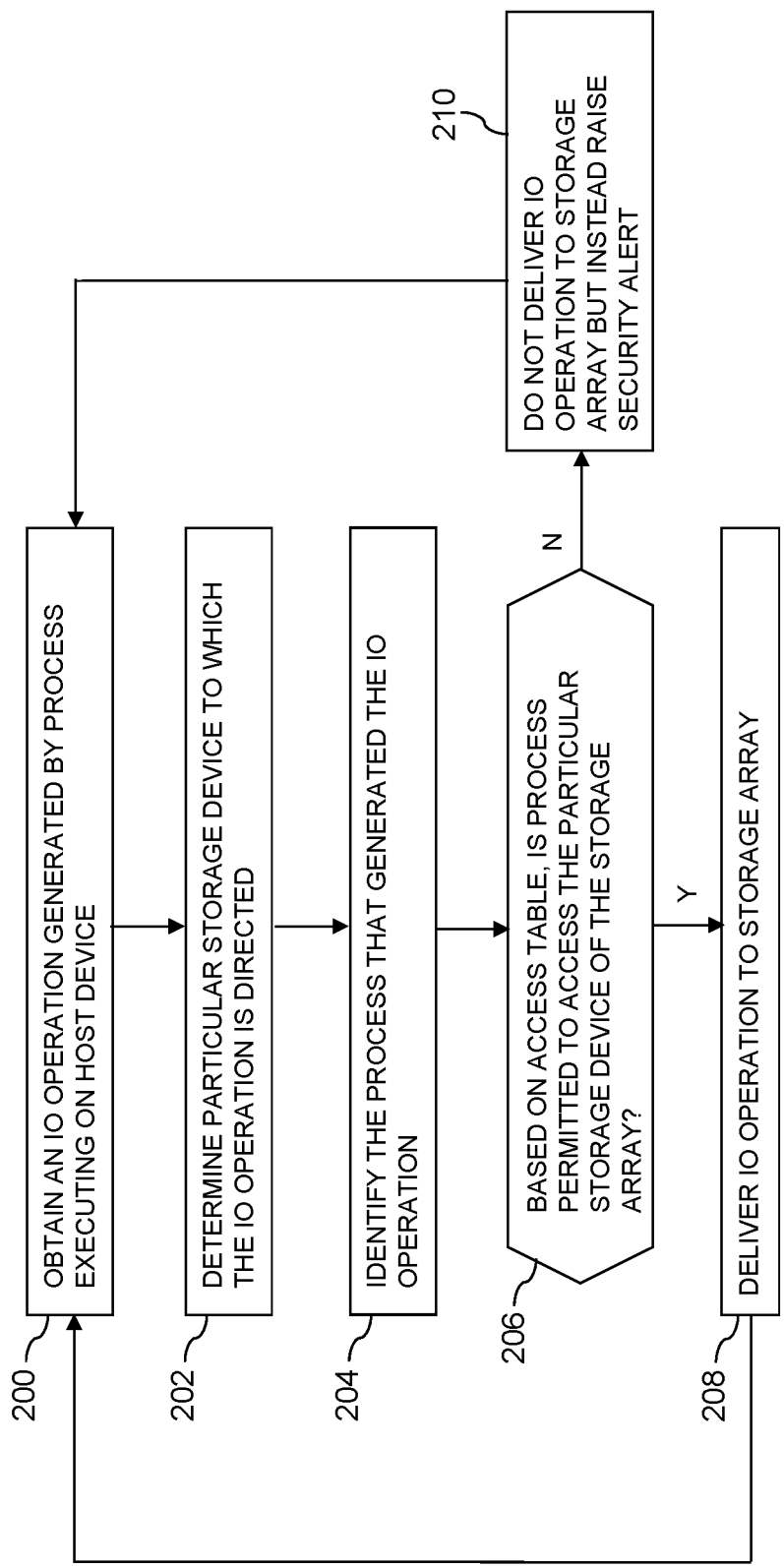
FIG. 2 is a flow diagram of a process for secure storage access utilizing a multi-path layer of a host device in an illustrative embodiment.

The steps of the FIG. 2 process are illustratively performed at least in part by or under the control of an MPIO driver of a given host device. For example, portions of the process may be carried out under the control of software, firmware and/or hardware of an instance of path selection logic deployed within the MPIO driver. Accordingly, the FIG. 2 process may be viewed as an example of an algorithm performed by the path selection logic 114-1 of the MPIO driver 112-1 of host device 102-1. Other arrangements of host device components and/or other system components can be configured to perform at least portions of one or more of the steps in other embodiments.

In step 200, an IO operation generated by a process executing on a host device is obtained. For example, the IO operation may be obtained by retrieving it from one of a plurality of IO queues of the host device. It is assumed that the IO operation is generated by a process of an application running on the host device, and is queued with other operations generated by other processes of that application and possibly other processes of other applications for further processing that includes secure storage access control as disclosed herein.

In step 202, the particular storage device to which the IO operation is directed is determined.

In step 204, the process that generated the IO operation is identified.

In step 206, a determination is made based on an access table as to whether or not the process that generated the IO operation is permitted to access the particular storage device of the storage array. If the process that generated the IO operation is permitted to access the particular storage device of the storage array, the FIG. 2 process moves to step 208, and otherwise moves to step 210 as indicated. An example of the access table is shown in FIG. 4 and described in more detail below, although it is to be appreciated that a wide variety of other access table types and configurations can be used. The term "access table" as used herein is therefore intended to be broadly construed.

In step 208, the IO operation is delivered to the storage array. It is assumed that the delivery of the IO operation to the storage array is over a particular path selected by the MPIO driver of the host device. The FIG. 2 process then returns to step 200 as indicated to obtain another IO operation in order to determine whether or not its corresponding process is permitted to access the particular storage device to which that IO operation is directed.

In step 210, the IO operation is not delivered to the storage array, but instead a security alert is raised. The FIG. 2 process then returns to step 200 as indicated to obtain another IO operation in order to determine whether or not its corresponding process is permitted to access the particular storage device to which that IO operation is directed.

Multiple additional instances of the FIG. 2 process may be performed in respective additional host devices that share the storage array. Other embodiments can include multiple storage arrays, with the secure storage access control being implemented for each of those storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and secure storage access functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different secure storage access arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
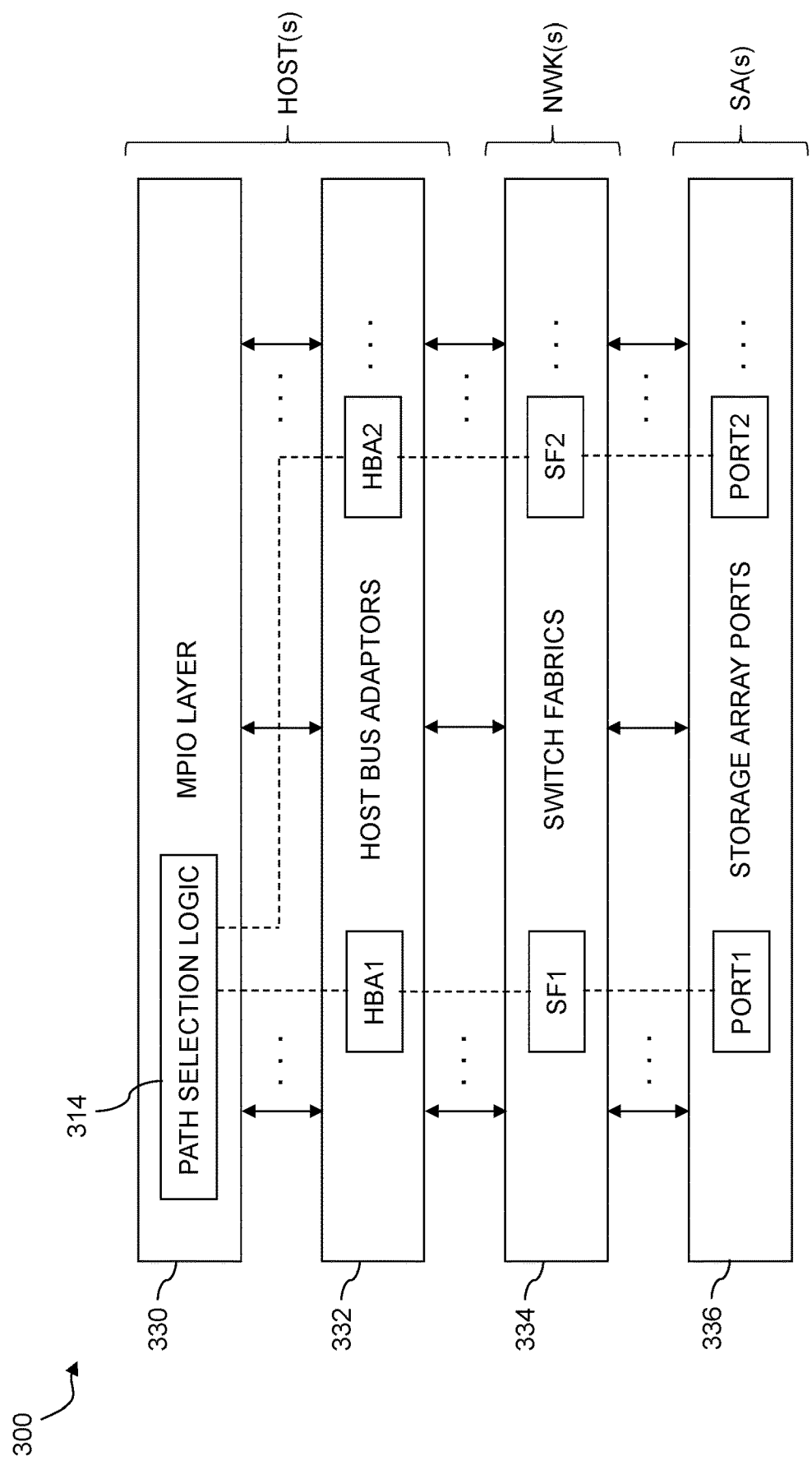
FIG. 3 is a block diagram showing multiple layers of a layered system architecture that includes a multi-path layer with functionality for secure storage access in an illustrative embodiment.

Referring now to FIG. 3, another illustrative embodiment is shown. In this embodiment, an information processing system 300 comprising at least one instance of path selection logic 314 is configured in accordance with a layered system architecture that includes an MPIO layer 330, an HBA layer 332, a switch fabric layer 334 and a storage array port layer 336. The MPIO layer 330 and the HBA layer 332 are associated with one or more host devices, the switch fabric layer 334 is associated with one or more SANs or other types of networks, and the storage array port layer 336 is associated with one or more storage arrays ("SAs"). The MPIO layer 330 is an example of what is also referred to herein as a multi-path layer, and comprises one or more MPIO drivers implemented in respective host devices. Each such MPIO driver illustratively comprises an instance of path selection logic 314 configured substantially as previously described. Additional or alternative layers and path selection logic arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 330 in this embodiment selects paths for delivery of IO operations to the one or more storage arrays having the storage array ports of the storage array port layer 336.

In the present embodiment, it is assumed that the path selection logic 314 is configured to provide secure storage access functionality of the type illustrated in conjunction with the flow diagram of FIG. 2. For example, prior to or otherwise in conjunction with selecting a path for delivery of a given IO operation to the storage array, the path selection logic 314 first determines the particular storage device to which the IO operation is directed, identifies the process that generated the IO operation, and checks the access table to determine if the process that generated the IO operation is permitted to access the particular storage device to which the IO operation is directed. If the access table indicates that the process that generated the IO operation is indeed permitted to access the particular storage device, the IO operation is delivered to the storage array over a selected path. Otherwise, an appropriate alert or other notification is triggered in the system 300. Various additional or alternative security actions may be taken in the system 300 responsive to detection of a process attempting to access a particular storage device that the process is not permitted to access.

Some implementations of the FIG. 3 embodiment can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

FIG. 4 shows an example of an access table 400 implemented in a multi-path layer of a particular host device 102-$i$, i=1, 2, . . . N, in an illustrative embodiment. The access table 400 in this embodiment comprises a plurality of entries for different ones of the storage devices 106 of the storage array 105, with each such entry comprising identifying information of at least one process permitted to access the corresponding storage device. The storage devices are denoted as Storage Device 1, Storage Device 2, . . . Storage Device M, and have their respective identifiers in a first column of the access table 400. For each of the storage devices, its corresponding entry of the access table 400 further comprises one or more process names of the one or more processes permitted to access that storage device, and one or more process identifiers (PIDs) of the one or more processes permitted to access that storage device. In other embodiments, the access table may comprise only the permitted process name(s) for each of the storage devices, or only the PID(s) of the one or more permitted processes for each of the storage devices. Numerous other types and arrangements of entries and fields can be used, and the term "access table" as used herein is therefore intended to be broadly construed.

Although the access table 400 in the present embodiment is assumed to be implemented in the multi-path layer of a host device, this is by way of example only, and in other embodiments the access table may be implemented in another part of the host device or system, and made accessible to the multi-path layer of the host device.

Additional examples of illustrative embodiments implemented using the FIG. 2 secure storage access process in a multi-path layer of a host device will now be described. It is assumed in these embodiments that the MPIO driver of a given host device provides the disclosed secure storage access functionality, under the control of a corresponding instance of path selection logic implemented in the MPIO driver, possibly with involvement of one or more other host device components.

In one or more of these embodiments, the MPIO driver and the storage array work together to block attacks.

For example, in order to prevent security threats based on addition of a new process containing malware to the host device, the following algorithm is performed by the MPIO driver operating in cooperation with the storage array, although it is to be appreciated that the ordering of the operations can be varied:

1. Create an access table on the host device. The access table includes an indication of its corresponding host device, and a plurality of entries for each of the protected storage devices of the storage array. Each such entry includes an identifier of the storage device, the process names of the processes permitted to access that storage device, and the PIDs of those processes. The PIDs are assumed to be added to the access table at runtime in this embodiment. The access table can be generated at least in part manually, such as by a user entering the process names that are permitted to access the storage device. Automated techniques may additionally or alternatively be used. For example, the MPIO driver can be configured to automatically create a list of PIDs accessing each storage device at a point at which the system is known to be "clean" and free of malware, such as immediately following a boot operation and/or immediately following application install. The MPIO driver can then add the process names associated with the respective PIDs to the access table.

2. Mark the storage devices on the storage array as being protected by the access table. For example, an Inquiry ("Inq") command bit of a SCSI storage protocol can be adapted for this purpose.

3. On application restart, which potentially changes the PIDs associated with particular process names, update the access table. Such an update is illustratively a user-ordered action, in which the user directs the host device to update the access table with the new PIDs as a separate action performed in conjunction with application restart. This helps to ensure that the access table update to include the new PIDs is performed as an intentional and desired action in conjunction with application restart, rather than driven by an attacker attempting to change the PIDs for malicious purposes.

4. Send the access table for storage in a persistent memory of the storage array. The access table as sent for storage in the storage array illustratively includes at least the storage device identifiers and for each storage device the process names for the one or more processes that are permitted to access that storage device.

5. Block any accesses by IO operations to a protected storage device unless the originating PID is found in the access table for this storage device. Alternatively, the MPIO driver may allow such an IO operation but trigger a warning of potential unauthorized access, so as to provide the user with an opportunity to authorize the process to access the storage device in those cases in which the user did not originally include that process among the authorized processes. Another option is to divert the IO operation to a temporary storage location and then reject the IO operation to the host device. Various types of forensic analysis can then be performed in order to determine if the IO operation is in fact from a malicious process.

6. Trigger a warning if the process name associated with a PID changes, as such a process name change might indicate an attack.

7. After a reboot, read the version of the access table stored in the storage array and compare it to the version of the access table stored in the host device. A warning is triggered if the two versions do not match one another. If the two versions do match one another, the MPIO driver will record the PIDs for the respective process names and begin controlling access to the storage devices per the allowed PIDs. Such an arrangement assumes a processing environment in which the MPIO driver can determine the PIDs and process names, although alternative arrangements can be used in other environments.

The example algorithm above is advantageously configured to ensure that attackers cannot add "Trojan horses" or other malware processes to the permitted processes for a given storage device in the access table.

Again, as in other algorithms described herein, these particular operations and their ordering can be varied in other embodiments.

In the foregoing example algorithm, the storage array can be configured to block IO operations from host devices that do not implement the secure storage access functionality. The storage array can identify those host devices as any host devices that do not store a corresponding access table in the storage array.

As another example, in order to prevent security threats based on modification of an existing host device process to incorporate malware, the following algorithm is performed:

1. Applications add to their records designated safety measures, in order to be able to identify whether a particular record is "good" or not. For example, in the case of an Oracle application, a "magic number" is added at byte 2 of each record, where the magic number comprises the ASCII value of the number 2. Also, Oracle applications place timestamps at the beginning and end of the record. Other applications implement other types of safety measures for their associated data.

2. The process name is used to determine the application to which the process belongs. For example, it is known that a DBWRITER process is part of an Oracle database application. Other types of applications have recognizable process names.

3. Based on the application that originated a given IO operation, the MPIO driver and/or the storage array can check the validity of a corresponding record or other data by determining if it exhibits the expected safety measures for that application. The IO operation is rejected if the validity check fails. In order to facilitate such validity checking by the storage array, the MPIO driver may add an application tag to the IO operation as described elsewhere herein so as to permit the storage array to perform the check before acknowledging the IO operation back to the host device.

As mentioned previously, different instances of the above-described algorithms and other secure storage access techniques can be performed by different MPIO drivers in different host devices.

The particular secure storage access arrangements described above are presented by way of illustrative example only. Numerous alternative arrangements of these and other features can be used in implementing the FIG. 2 process and other illustrative embodiments.

The illustrative embodiments disclosed herein can provide a number of significant advantages relative to conventional arrangements.

For example, some embodiments configure a multi-path layer of one or more host devices to include functionality for secure storage access that prevents unauthorized processes of a host device from accessing sensitive data of a storage system.

Such embodiments can advantageously detect and neutralize a number of security threats that could otherwise be highly problematic. These include security threats in which a hacker modifies the code of an existing host device process to incorporate malware, or causes a new process containing malware to run on the host device.

Illustrative embodiments prevent the hacker from gaining access to sensitive data of the storage system in these and other situations, thereby providing significant advantages over conventional anti-virus techniques that typically operate at a file system level and therefore generally cannot detect such security threats.

Accordingly, some embodiments leverage a multi-path layer of one or more host devices to provide enhanced protection against viruses and other types of malware which might otherwise go undetected.

These and other arrangements are advantageously configured to provide efficient secure storage access even in the presence of substantial path changes such as those that may result when paths are added or deleted as a result of zoning and masking changes or other types of storage system reconfigurations performed by a storage administrator or other user.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic and additional or alternative components. Also, the particular configurations of system and device elements and associated processing operations illustratively shown in the drawings can be varied in other embodiments. For example, a wide variety of different MPIO driver configurations and associated secure storage access arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device configured to communicate over a network with a storage system comprising a plurality of storage devices;
the host device being further configured to execute multiple processes that generate input-output operations for delivery to the storage system;
the host device comprising:
a multi-path input-output driver configured to control delivery of the input-output operations to the storage system over selected ones of a plurality of paths through the network;

wherein the multi-path input-output driver is further configured:
to store for each of one or more of the storage devices information specifying one or more of the processes executing on the host device that are permitted to access that storage device; and
for each of at least a subset of the input-output operations:
to determine the particular storage device to which the input-output operation is directed;
to identify the process that generated the input-output operation; and
to control delivery of the input-output operation based at least in part on whether or not the stored information indicates that the identified process is permitted to access the particular storage device;
wherein the stored information comprises an access table and wherein the access table comprises a plurality of entries for different ones of the storage devices with each such entry comprising identifying information of at least one process permitted to access the corresponding storage device.

2. The apparatus of claim 1 further comprising one or more additional host devices each configured to communicate over the network with the storage system and wherein each additional host device comprises a multi-path input-output driver configured to control delivery of input-output operations from that host device to the storage system over selected ones of a plurality of paths through the network.

3. The apparatus of claim 1 wherein the storage devices comprise respective logical storage volumes of the storage system.

4. The apparatus of claim 1 wherein the identifying information comprises at least one of a process name and a process identifier for the process permitted to access the corresponding storage device.

5. The apparatus of claim 1 wherein at least a portion of the access table is generated by the multi-path input-output driver and is sent by the multi-path input-output driver to the storage system for storage therein.

6. The apparatus of claim 1 wherein the multi-path input-output driver is configured to generate at least portions of an initial version of the access table responsive to at least one of a boot of the host device and an install of one or more applications, the multi-path input-output driver populating the access table with process identifiers at runtime, and wherein a subsequent update to the access table performed in conjunction with an application restart is implemented at least in part as a user-ordered action.

7. The apparatus of claim 1 wherein controlling delivery of the input-output operation based at least in part on whether or not the stored information indicates that the identified process is permitted to access the particular storage device comprises preventing delivery of the input-output operation to the storage system responsive to the stored information indicating that the identified process is not permitted to access the particular storage device.

8. The apparatus of claim 1 wherein controlling delivery of the input-output operation based at least in part on whether or not the stored information indicates that the identified process is permitted to access the particular storage device comprises at least one of:
diverting the input-output operation to a designated temporary location responsive to the stored information indicating that the identified process is not permitted to access the particular storage device; and
triggering an alert to the host device responsive to the stored information indicating that the identified process is not permitted to access the particular storage device.

9. The apparatus of claim 1 wherein controlling delivery of the input-output operation based at least in part on whether or not the stored information indicates that the identified process is permitted to access the particular storage device comprises permitting delivery of the input-output operation to the storage system responsive to the stored information indicating that the identified process is permitted to access the particular storage device.

10. The apparatus of claim 1 wherein one or more of the storage devices are marked as having respective entries in the stored information.

11. The apparatus of claim 10 wherein marking of the storage devices comprises sending one or more predetermined commands to the storage system.

12. The apparatus of claim 1 wherein responsive to a reboot of the host device, the multi-path input-output driver is further configured:
to compare a first version of the access table stored in the host device with a second version of the access table stored in the storage system; and
to trigger an alert to the host device if the first and second versions of the access table do not match one another.

13. The apparatus of claim 1 wherein the multi-path input-output driver is further configured to add an application tag to the input-output operation so as to permit the storage system to perform a validity check on the input-output operation.

14. A method comprising:
executing in a host device multiple processes that generate input-output operations for delivery to a storage system comprising a plurality of storage devices;
implementing a multi-path input-output driver in the host device, the multi-path input-output driver controlling delivery of the input-output operations from the host device to the storage system over selected ones of a plurality of paths through the network; and
configuring the multi-path input-output driver to perform steps of:
storing for each of one or more of the storage devices of the storage system information specifying one or more of the processes executing on the host device that are permitted to access that storage device; and
for each of at least a subset of the input-output operations:
determining the particular storage device to which the input-output operation is directed;
identifying the process that generated the input-output operation; and
controlling delivery of the input-output operation based at least in part on whether or not the stored information indicates that the identified process is permitted to access the particular storage device;
wherein the stored information comprises an access table and wherein the access table comprises a plurality of entries for different ones of the storage devices with each such entry comprising at least one identifier of a process permitted to access the corresponding storage device.

15. The method of claim 14 wherein controlling delivery of the input-output operation based at least in part on whether or not the stored information indicates that the identified process is permitted to access the particular storage device comprises at least one of:
preventing delivery of the input-output operation to the storage system responsive to the stored information indicating that the identified process is not permitted to access the particular storage device; and permitting delivery of the input-output operation to the storage system responsive to the stored information indicating that the identified process is permitted to access the particular storage device.

16. A computer program product comprising a non-transitory processor-readable storage medium having stored therein program code of one or more software programs, wherein the program code, when executed by a host device configured to communicate over a network with a storage system comprising a plurality of storage devices, causes the host device:

to execute multiple processes that generate input-output operations for delivery to the storage system;

to implement a multi-path input-output driver in the host device, the multi-path input-output driver controlling delivery of the input-output operations from the host device to the storage system over selected ones of a plurality of paths through the network; and to configure the multi-path input-output driver to perform steps of:

storing for each of one or more of the storage devices of the storage system information specifying one or more of the processes executing on the host device that are permitted to access that storage device; and for each of at least a subset of the input-output operations:

determining the particular storage device to which the input-output operation is directed;

identifying the process that generated the input-output operation; and controlling delivery of the input-output operation based at least in part on whether or not the stored information indicates that the identified process is permitted to access the particular storage device;

wherein the stored information comprises an access table and wherein the access table comprises a plurality of entries for different ones of the storage devices with each such entry comprising at least one identifier of a process permitted to access the corresponding storage device.

17. The computer program product of claim 16 wherein controlling delivery of the input-output operation based at least in part on whether or not the stored information indicates that the identified process is permitted to access the particular storage device comprises at least one of:

preventing delivery of the input-output operation to the storage system responsive to the stored information indicating that the identified process is not permitted to access the particular storage device; and permitting delivery of the input-output operation to the storage system responsive to the stored information indicating that the identified process is permitted to access the particular storage device.

18. The method of claim 14 wherein the identifying information comprises at least one of a process name and a process identifier for the process permitted to access the corresponding storage device.

19. The method of claim 14 wherein at least a portion of the access table is generated by the multi-path input-output driver and is sent by the multi-path input-output driver to the storage system for storage therein.

20. The method of claim 14 wherein responsive to a reboot of the host device, the multi-path input-output driver is further configured to perform the steps of:

comparing a first version of the access table stored in the host device with a second version of the access table stored in the storage system; and triggering an alert to the host device if the first and second versions of the access table do not match one another.

* * * * *